US007721617B2

(12) United States Patent
Fukumura

(10) Patent No.: US 7,721,617 B2
(45) Date of Patent: May 25, 2010

(54) HEAT-TREATED RACK BAR

(75) Inventor: Kenichi Fukumura, Aichi-ken (JP)

(73) Assignee: JTEKT Corporation, Osaka (JP)

( * ) Notice: Subject to any disclaimer, the term of this patent is extended or adjusted under 35 U.S.C. 154(b) by 1042 days.

(21) Appl. No.: 10/455,430

(22) Filed: Jun. 6, 2003

(65) Prior Publication Data

US 2004/0007801 A1    Jan. 15, 2004

(30) Foreign Application Priority Data

Jun. 6, 2002  (JP) ............................. 2002-165825

(51) Int. Cl.
- F16H 1/04 (2006.01)
- F16H 35/00 (2006.01)
- C21D 9/22 (2006.01)
- C21D 9/24 (2006.01)

(52) U.S. Cl. .................. 74/422; 74/388 PS; 148/573

(58) Field of Classification Search .............. 74/422, 74/424.6, 388 PS, 29, 109; 148/570, 572, 148/573

See application file for complete search history.

(56) References Cited

U.S. PATENT DOCUMENTS

| | | | | |
|---|---|---|---|---|
| 5,428,208 A | * | 6/1995 | Chatterjee et al. | 219/635 |
| 5,473,960 A | * | 12/1995 | Sakamoto et al. | 74/422 |
| 5,988,005 A | * | 11/1999 | Onodera et al. | 74/388 PS |
| 6,454,042 B1 | * | 9/2002 | Yoshida et al. | 180/444 |
| 6,464,034 B1 | * | 10/2002 | Toda et al. | 180/444 |
| 6,502,473 B1 | * | 1/2003 | Akiyama et al. | 74/89.17 |
| 6,706,127 B1 | * | 3/2004 | Duggirala et al. | 148/570 |

FOREIGN PATENT DOCUMENTS

| | | |
|---|---|---|
| EP | 0 857 639 | 8/1998 |
| JP | 57-120621 | 7/1982 |
| JP | 57-158325 | 9/1982 |
| JP | 9-132151 | 5/1997 |
| JP | 11-21619 | 1/1999 |
| JP | 11-82666 | 3/1999 |
| JP | 2000-282145 | 10/2000 |
| JP | 2001099269 A * | 4/2001 |
| JP | 2001234245 A * | 8/2001 |
| JP | 2002-154442 | 5/2002 |

OTHER PUBLICATIONS

Avallone et al, Marks' Standard Handbook for Mechanical Engineers, 10th Ed., McGraw-Hill, 1996, pp. 6-19 to 6-21.*
Patent Abstracts of Japan, JP 59-155734, Sep. 4, 1984.

* cited by examiner

Primary Examiner—Thomas R Hannon
Assistant Examiner—Justin Krause
(74) Attorney, Agent, or Firm—Oblon, Spivak, McClelland, Maier & Neustadt, L.L.P.

(57) ABSTRACT

A method of heat-treating a rack bar includes a step of continuously conveying a rack bar provided with a rack teeth portion and a ball screw portion by a quenching means, and a step of sequentially applying a quenching treatment to each circumferential surface of the rack teeth portion and the ball screw portion. The quenching treatment is preferably and sequentially applied to each entire circumferential surface of the rack teeth portion and the ball screw portion.

2 Claims, 8 Drawing Sheets

Conditions of high-frequency quenching (A)

|  | End push guiding portion | Ball screw portion | Intermediate portion | Rack teeth portion |
|---|---|---|---|---|
| Output power | 105.6kW | 114.4Kw | 114.4Kw | 114.4Kw |
| Feed rate | 15.0mm/sec | 12.5mm/sec | 12.5mm/sec | 10.0mm/sec |
| Cooling limit waiting time | 10.0sec | | | |
| Cooling flow | 45L/min | | | |
| Non-oxidation nitrogen gas flow rate | 150L/min | | | |

Conditions of high-frequency tempering (B)

|  | End push guiding portion | Ball screw portion | Intermediate portion | Rack teeth portion |
|---|---|---|---|---|
| Output power | 10kW | 10kW | 10kW | 10kW |
| Feed rate | 10.5mm/sec | 18.5mm/sec | 17.0mm/sec | 10.5mm/sec |
| Cooling limit waiting time | 2min | | | |
| Cooling flow | Sink into coolant tank | | | |

Fig. 4

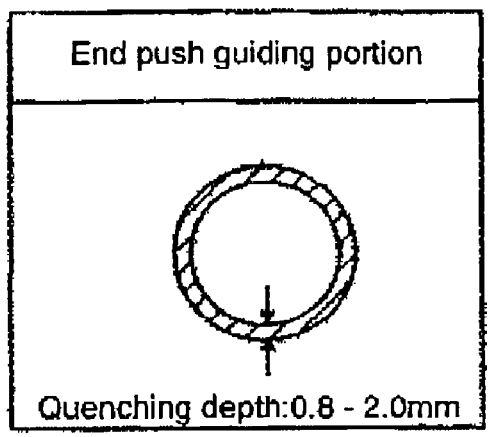 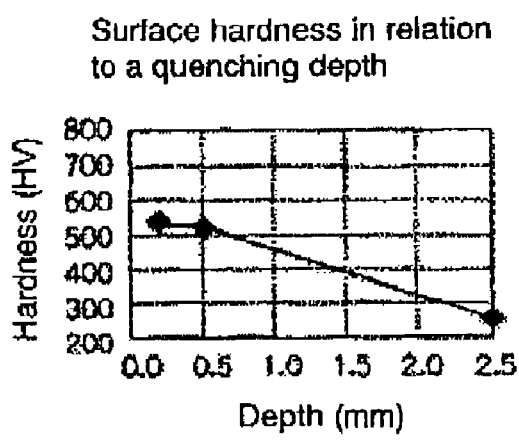
(A) (B)
Fig. 5

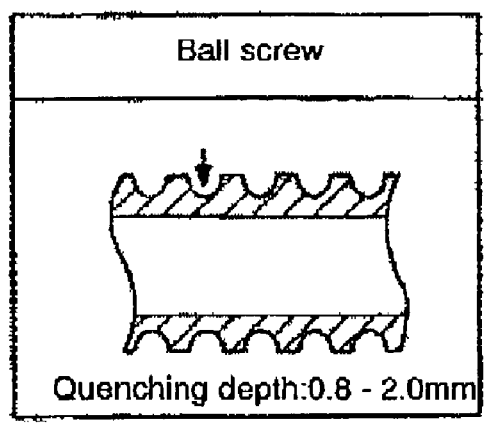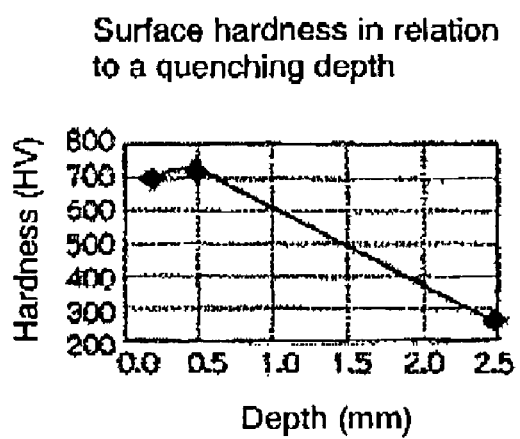
(A) (B)
Fig. 6

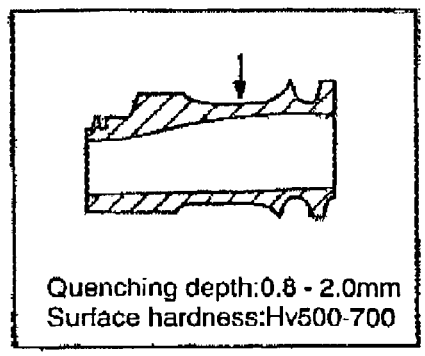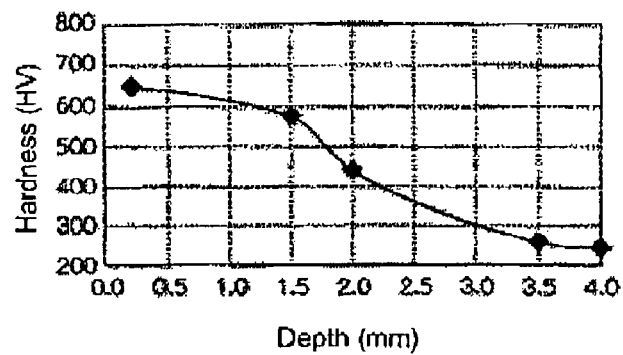
(A)          (B)
Fig. 7

Surface hardness in relation to a quenching depth
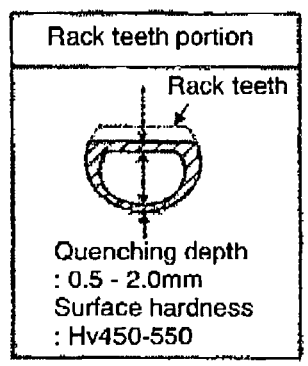 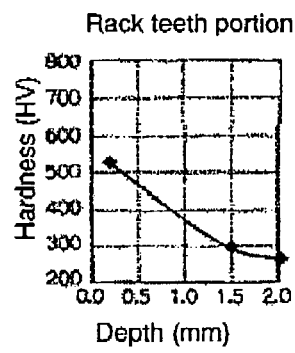 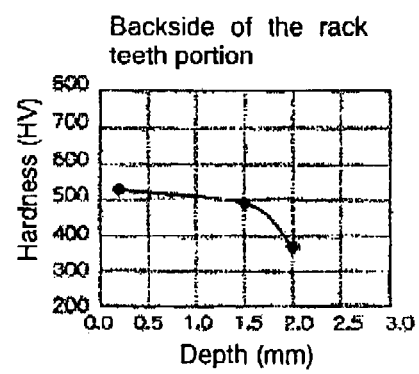
(A)          (B)          (C)
Fig. 8

HEAT-TREATED RACK BAR

CROSS REFERENCE TO RELATED APPLICATIONS

This application is based on and claims priority under 35 U.S.C. §119 with respect to a Japanese Patent Application 2002-165825, filed on Jun. 6, 2002, the entire content of which is incorporated herein by reference.

FIELD OF THE INVENTION

This invention generally relates to a method of heat-treating a rack bar applicable for a vehicle steering device for steering a vehicle steered wheel, and the rack bar.

BACKGROUND OF THE INVENTION

A known vehicle steering device is provided with a so-called rack and pinion type steering gear mechanism including a rack bar. The rack and pinion type steering gear mechanism is connected to a pair of knuckle arms for respective right and left vehicle steered wheels via a steering link mechanism so as to steer the steered wheels. Especially, when the steering gear mechanism having the rack bar is used for an electrically powered steering device, the rack bar is integrally provided with a rack teeth portion engaged with a pinion teeth portion provided at an end of a steering shaft connected to a steered wheel, a ball screw portion for the electrically powered steering device, and an end push guiding portion.

According to the steering gear mechanism with the above-described structure, a surface hardening heat treatment such as a quenching treatment is applied to the rack bar so as to assure surface hardness demanded for predetermined portions thereof. More particularly, a resistance quenching treatment is applied to the rack teeth portion so as to assure surface hardness for the teeth portion. The backside of the rack teeth portion, on which teeth is not provided, is not applied with the surface hardening heat treatment. The ball screw portion is applied with an induction quenching treatment so as to assure surface hardness on an entire surface area thereof. The end push guiding portion, which is not demanded with the surface hardening heat treatment, remains unmachined. Therefore, each portion of the known rack bar can be assured with the surface hardness required for each.

However, according to the above-described rack bar and the method of heat-treating the rack bar, respective quenching devices and methods are required independently for the respective portions so as to assure the surface hardness respectively required. This may cause decrease of productivity of the rack bar.

Further, when the teeth of the rack teeth portion is applied with the quenching treatment, the rack teeth portion may be undesirably twisted or warped. In this case, special attentions, special measure, or special quality controls may be required for avoiding the twist or warp of the rack teeth portion. This may also cause the decrease of productivity of the rack bar.

The present invention therefore seeks to provide an improved method of heat-treating a rack bar, which enables to assure surface hardness required for each portion, and which enables to improve manufacturing precision for manufacturing the rack bar, thereby leading to widely enhancing the productivity of the rack bar. Further, the present invention therefore seeks to provide an improved rack bar which can possess portions with required surface hardness, and can be manufactured with an improved manufacturing precision and productivity.

SUMMARY OF THE INVENTION

According to an aspect of the present invention, a method of heat-treating a rack bar includes a step of continuously conveying a rack bar provided with a rack teeth portion and a ball screw portion by a quenching means, and a step of sequentially applying a quenching treatment to each circumferential surface of the rack teeth portion and the ball screw portion. It is preferable that the quenching treatment is sequentially applied to each entire circumferential surface of the rack teeth portion and the ball screw portion.

According to another aspect of the present invention the method of heat-treating a rack bar further includes a step of continuously conveying the rack bar, and a step of sequentially applying tempering treatment to the rack teeth portion and the ball screw portion. It is preferable that the tempering treatment is performed by use of the quenching means.

It is preferable that a quenching condition for quenching the rack teeth portion and a quenching condition for quenching the ball screw portion are independently determined based upon surface hardness and quenching depth required to the rack teeth portion and the ball screw portion, respectively. The quenching condition includes a conveying speed and a heating temperature.

The method of heat-treating a rack bar can be applied to the rack bar operatively connected to knuckle arms for right and left vehicle steered wheels. The rack teeth portion of the rack bar is engaged with a pinion teeth portion provided at an end of a steering shaft connected to a vehicle steered wheel. The ball screw portion of the rack bar is used for an electrically powered steering device.

BRIEF DESCRIPTION OF THE DRAWING FIGURES

The foregoing and additional features and characteristics of the present invention will become more apparent from the following detailed description considered with reference to the accompanying drawing figures wherein.

FIGS. 4(A) and 4(B) explains conditions of the heat-treatment applied to each portion of the rack bar 10;

FIGS. 5(A) and 5(B) illustrate a surface hardness in relation to a quenching depth. of an end push guiding portion of the rack bar applied with the heat-treatment according to the embodiment of the present invention;

FIGS. 6(A) and 6(B) illustrate a surface hardness in relation to a quenching depth of a ball screw of the rack bar applied with the heat-treatment according to the embodiment of the present invention;

FIGS. 7(A) and 7(B) illustrate a surface hardness in relation to a quenching depth of an intermediate portion of the rack bar applied with the heat-treatment according to the embodiment of the present invention; and FIGS. 8(A) to 8(C) illustrate a surface hardness in relation to a quenching depth of a rack teeth portion of the rack bar applied with the heat-treatment according to the embodiment of the present invention.

DETAILED DESCRIPTION OF THE INVENTION

An embodiment of the present invention will be described hereinbelow in detail with reference to the accompanying drawings.

Figure 1:
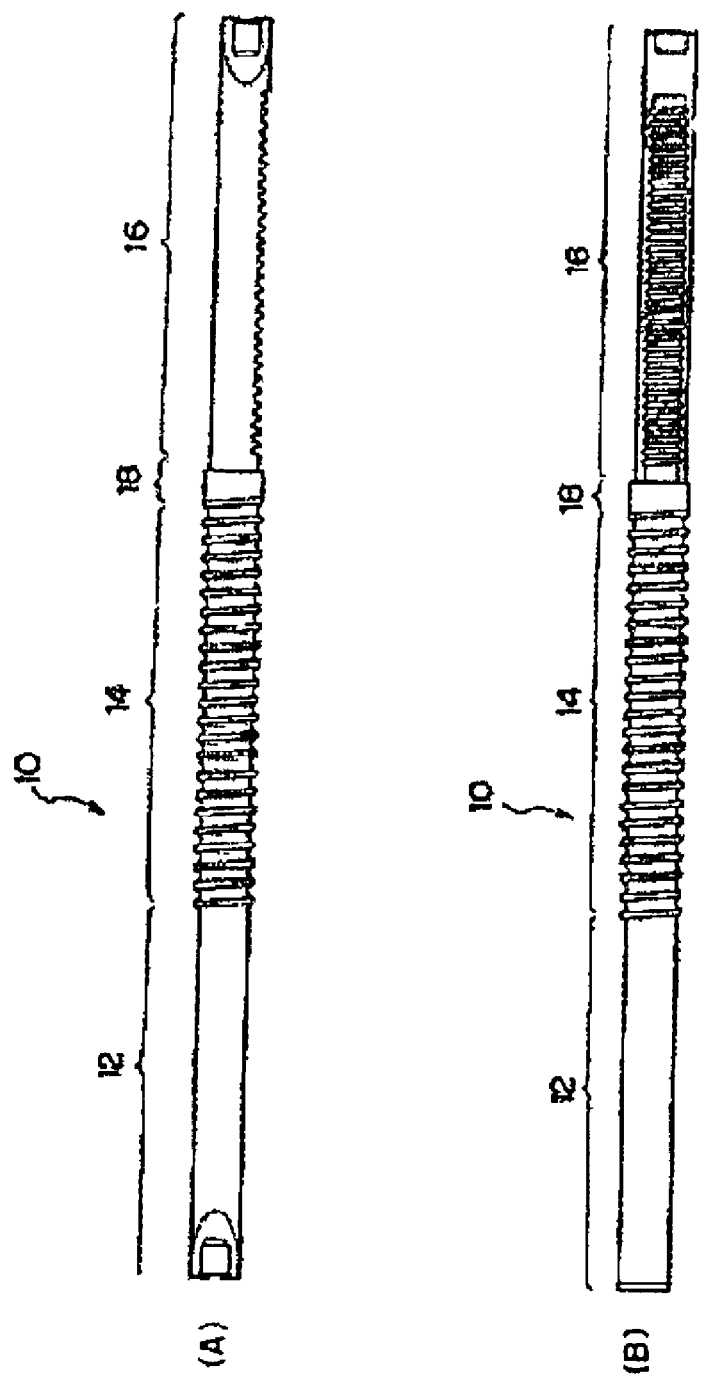
FIG. 1(A) is a plan view illustrating an entire structure of a rack bar according to an embodiment of the present invention.
FIG. 1(B) is a front view illustrating the entire structure of the rack bar illustrated in FIG. 1(A)

As seen in FIGS. 1(A) and 1(B), the rack bar 10 is included in a steering gear mechanism applicable for an electrically powered steering device and is provided with an end push guiding portion 12 possessing a diameter of approximately 24 mm, a ball screw portion 14 for the electrically powered steering device, a rack teeth portion 16 engaged with a pinion teeth portion provided at an end of a steering shaft (not shown) connected to a steered wheel (not shown), and an intermediate portion 18 disposed between the ball screw portion 14 and the rack teeth portion 16. Both ends of the rack bar 10 are connected to tie rods (not shown) which are respectively connected to right and left vehicle steered wheels via knuckle arms (not shown).

Figure 2:
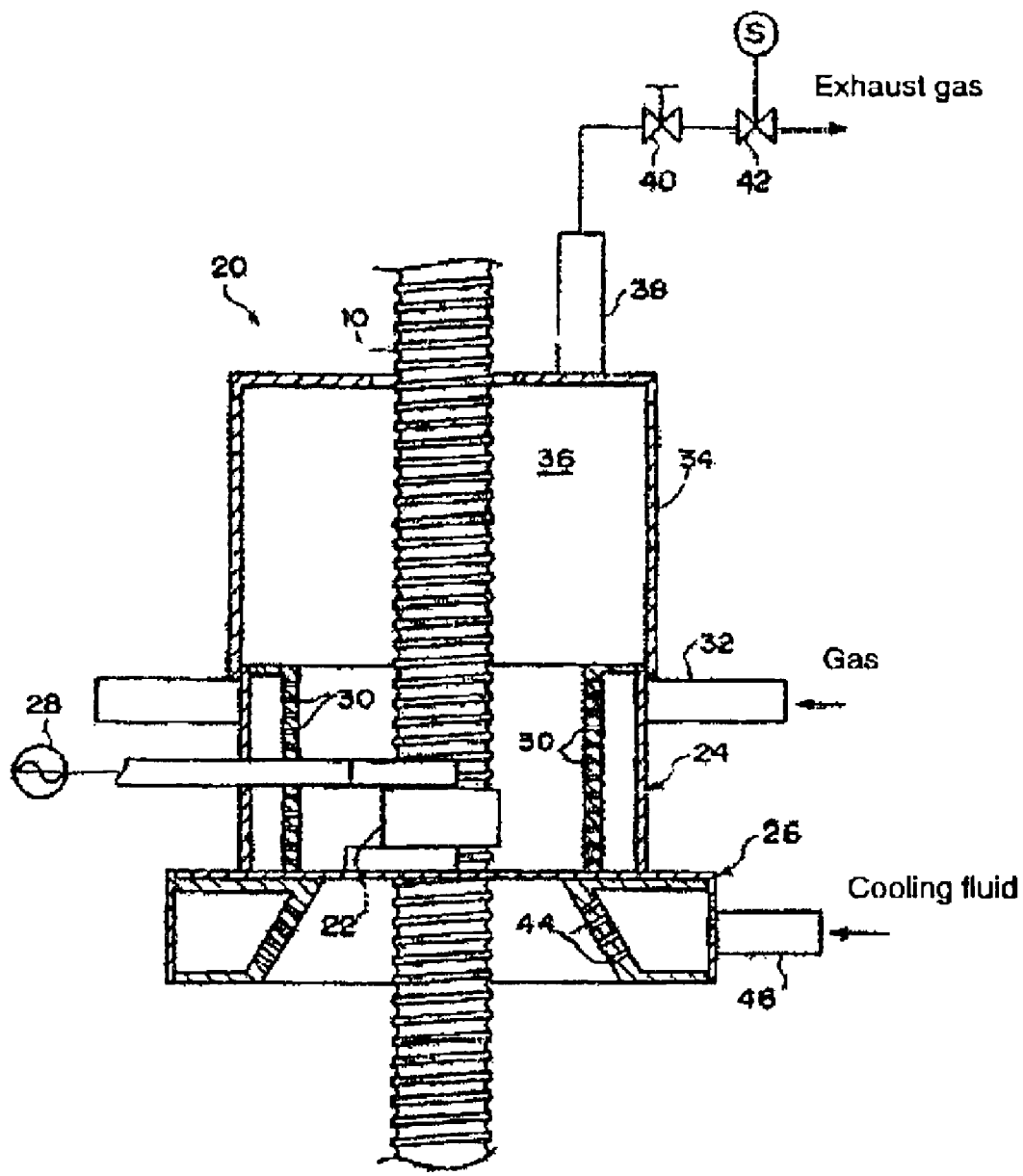
FIG. 2 is a cross-sectional view schematically illustrating a structure of a heat-treatment device according to the embodiment of the present invention.

Next, description will be given for explaining a device for applying the heat-treating process to the rack bar 10. A device disclosed in a Japanese Patent Laid-Open Publication published as No. 1999-21619 can be used as a heat-treatment device according to the embodiment of the present invention. As illustrated in FIG. 2, a heat-treatment device (a quenching means, a quenching-treatment device) 20 functions for applying a heat-treatment such as a quenching treatment and a high-frequency quenching treatment to the rack bar 10 as a work. The rack bar 10 is supported by a not-shown mechanism which moves the rack bar 10 in a longitudinal direction thereof so that the rack bar 10 is moved in the longitudinal direction along rotation thereof in the heat-treatment device 20.

The heat-treatment device 20 is provided with a high-frequency induction heating coil 22 for applying a high-frequency induction heating treatment to the surface of the rack bar 10, a gas injection cylinder 24 surrounding the high-frequency induction heating coil 22, and a cooling fluid injection cylinder 26 disposed below the gas injection cylinder 24.

The high-frequency induction heating coil 22 is disposed so as to surround the circumferential surface of the rack bar 10. In this case, the circumferential surface of the rack bar 10 can denote the entire external diameter of the rack bar 10. The high-frequency induction heating coil 22 is supplied with electric current possessing high-frequency wave from a high-frequency power source 28 so as to heat the surface of the rack bar 10 up to a predetermined temperature.

The gas injection cylinder 24 is provided with a great number of gas injection bores 30 in an inner peripheral surface thereof and is further connected to a gas inlet conduit 32. The gas injection cylinder 24 is supplied with gas such as inert gas, reducing nature gas, or the like, from the gas injection conduit 32. The gas is injected from the gas injection bores 30 at a predetermined pressure level and at a predetermined gas amount and is sprayed on the surface of the rack bar 10.

Provided is a gas filled chamber 36 by a housing 34 at an upper side of the gas injection cylinder 24. The filled chamber 36 is connected to a gas drain conduit 38. The gas drain conduit 38 is connected to an exhaust gas amount adjusting valve 40 and a solenoid valve 42 which are arranged in series.

The cooling fluid injection cylinder 26 is provided with a great number of cooling fluid injection bores 44 in an inner peripheral surface thereof and is further connected to a cooling fluid inlet conduit 46. The cooling fluid supplied to the cooling fluid injection cylinder 26 is injected from the cooling fluid injection bores 44 at a predetermined pressure level and at a predetermined fluid amount and is sprayed on the surface of the heated rack bar 10.

Figure 3:
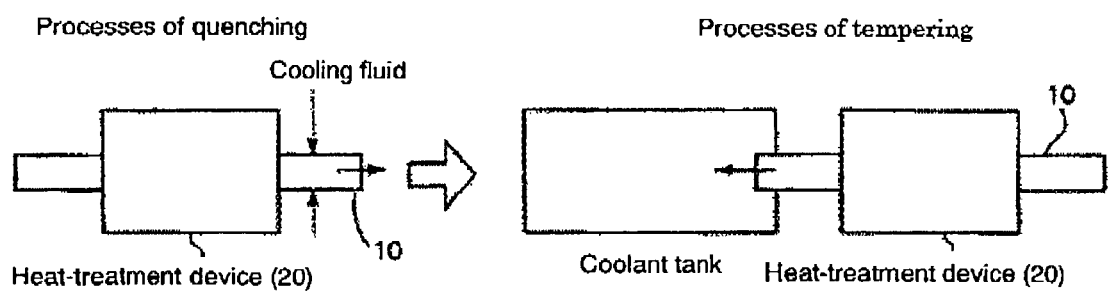
FIG. 3 is a block view schematically illustrating. an entire structure of a heat-treatment according to the embodiment of the present invention.

Next, following description will be given for explaining detailed procedure for applying the heat-treatment to the rack bar 10 by the heat-treatment device 20 with the above-described structure. As illustrated in FIG. 3, the heat-treatment is divided into two processes of quenching and tempering.

The rack bar 10 is continuously conveyed by a single unit of the heat-treatment device 20 and the entire circumferential surface of each end push guiding portion 12, the bull screw 14, the intermediate portion 18, and the rack teeth portion 16 is sequentially applied with the quenching treatment. More particularly, as seen in FIG. 2, the rack bar 10 is moved in a downward direction in the drawing along the rotation thereof in the heat-treatment device 20. The rack bar 10 is sprayed with the gas at the predetermined pressure level and at the predetermined gas amount injected from the gas injection bores 80 of the gas injection cylinder 24. The surface of the rack bar 10 is then heated up to a predetermined temperature by the high-frequency induction heating coil 22. After being heated up, the rack bar 10 is then sprayed with the cooling fluid at the predetermined pressure level and at the predetermined fluid amount from the cooling fluid injection bores 44 of the cooling fluid injection cylinder 26. As described above, the quenching treatment, which is one of the processes of the heat-treatment, is preferably performed. The rack bar 10 can be then continuously conveyed in an opposite order to the order for the quenching treatment so as to sequentially perform the tempering treatment.

As explained in FIGS. 4(A) and 4(B), described are conditions of the quenching and tempering processes to be applied to the respective portions of the rack bar 10, such as output power for performing the high-frequency induction-heat-treatment, conveying speed of the-rack bar 10, and the like.

In the above-described heat-treatment according to the embodiment of the present invention, the rack bar 10 is continuously conveyed and the entire circumferential surface of each portion of the rack bar 10 is sequentially applied with the induction quenching treatment by the heat-treatment device (the quenching-treatment device) 20. The rack bar 10, which has been already applied the quenching treatment, can be continuously conveyed in an opposite order to the order for the quenching treatment and can be sequentially applied with the tempering treatment. Therefore, respective portions of the rack bar 10 can be assured with the surface hardness respectively required. In this case, the conveying speed of the rack bar 10 and the heating temperature of each portion thereof are independently determined in accordance with required surface hardness and quenching depth for each portion thereof. Therefore, an only one process for quenching treatment can satisfy the required surface hardness and quenching depth for each portion of the rack bar 10.

According to the embodiment of the present invention, the rack bar 10 is conveyed in the opposite order to the order for the quenching treatment so as to be applied with the tempering treatment. Alternatively, the rack bar 10 can be conveyed in the same sequential order as the order for the quenching treatment so as to be applied with the tempering treatment. Further, the rack bar containing a relatively large amount of carbon is necessarily applied with the tempering treatment so as to be assured with the required surface hardness. In this case, the rack bar 10 can be prevented from deformation and fluctuation. In the meantime, the rack bar containing a relatively small amount of carbon is not necessarily applied with the tempering treatment. If the tempering treatment is unnecessarily applied to this type of rack bar, the required surface hardness of each portion may not be satisfied.

As explained by FIGS. 5 through 8, the required surface hardness relative to the quenching depth of each portion of the rack bar 10 can be satisfied by the above-described heat-treatment according to the embodiment of the present invention.

As described above, the entire circumferential surface of the end push guiding portion 12, the ball screw portion 14, the intermediate portion 18, and the rack teeth portion 16 can be sequentially applied with the induction quenching treatment by the single unit of the heat-treatment device 20. In other words, the quenching treatment for each portion of the rack bar 10 can be performed by the one process. Therefore, each portion can be assured with the preferable surface hardness without preparing plural hardening devices or plural processes, thereby enabling to widely enhance productivity of the rack bar 10.

Further, the rack bar 10 can be effectively prevented from being twisted or warped after being applied with the quenching treatment. Therefore, special cautions or quality controls are not required, thereby enabling to widely enhance productivity of the rack bar 10.

Still further, according to the embodiment of the present invention, the rack bar 10 can be manufactured with higher working precision.

According to the embodiment of the present invention, the rack bar 10 is integrally provided with the end push guiding portion 12, the ball screw 14, the intermediate portion 18, and the rack teeth portion 16. Alternatively, the above-described quenching treatment can be applicable for a rack bar which is not provided with the end push guiding portion 12. In this case, each entire circumferential surface of the rack teeth portion 16 and the ball screw 14 can be successively and sequentially applied with the quenching treatment by the single unit of the quenching device.

The principles, preferred embodiment and mode of operation of the present invention have been described in the foregoing specification and drawings. However, the invention which is intended to be protected is not to be construed as limited to the particular embodiment disclosed. Further, the embodiment described herein is to be regarded as illustrative rather than restrictive. The plural objectives are achieved by the present invention, and yet there is usefulness in the present invention as far as one of the objectives are achieved. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

I claim:

1. A rack bar comprising:
   a rack teeth portion on a surface along the length of the rack bar;
   a ball screw portion on the surface along the length of the rack bar, wherein the ball screw portion is axially offset from the rack teeth portion along the length of the rack bar;
   wherein an entirety of the surface of the rack bar, including the rack teeth portion and the ball screw portion, is quench surface hardened, wherein the depth of the quench surface hardening of the entire circumference of the rack teeth portion is uniform and is different from the depth of quench surface hardening of the ball screw portion.

2. A rack bar according to claim 1, wherein the rack bar is adapted to be operatively connected to knuckle arms for right and left steered wheels of the vehicle, the rack teeth portion of the rack bar is adapted to be engaged with a pinion teeth portion provided at an end of a steering shaft connected to a vehicle steered wheel, and the ball screw portion of the rack bar is adapted to be used for an electrically powered steering device.

* * * * *